United States Patent
Cai et al.

(10) Patent No.: US 10,812,718 B2
(45) Date of Patent: Oct. 20, 2020

(54) METHOD AND SYSTEM FOR PANORAMIC VIDEO STABILIZATION, AND PORTABLE TERMINAL

(71) Applicant: ARASHI VISION INC., Shenzhen, Guangdong Province (CN)

(72) Inventors: Jinlin Cai, Shenzhen (CN); Wenjie Jiang, Shenzhen (CN); Jingkang Liu, Shenzhen (CN)

(73) Assignee: ARASHI VISION INC., Shenzhen, Guangdong Province (CN)

( * ) Notice: Subject to any disclaimer, the term of this patent is extended or adjusted under 35 U.S.C. 154(b) by 0 days.

(21) Appl. No.: 16/481,454

(22) PCT Filed: Feb. 5, 2018

(86) PCT No.: PCT/CN2018/075265
§ 371 (c)(1),
(2) Date: Jul. 26, 2019

(87) PCT Pub. No.: WO2018/184423
PCT Pub. Date: Oct. 11, 2018

(65) Prior Publication Data
US 2019/0349526 A1  Nov. 14, 2019

(30) Foreign Application Priority Data

Apr. 7, 2017  (CN) .......................... 2017 1 0225056

(51) Int. Cl.
*H04N 5/232*  (2006.01)
*G06T 7/277*  (2017.01)
*G06T 3/60*  (2006.01)

(52) U.S. Cl.
CPC ........... *H04N 5/23261* (2013.01); *G06T 3/60* (2013.01); *G06T 7/277* (2017.01); *H04N 5/23238* (2013.01); *H04N 5/23258* (2013.01)

(58) Field of Classification Search
CPC .......... H04N 5/23248–23261; H04N 5/23238; H04N 5/23264–2329; G06T 7/277;
(Continued)

(56) References Cited

U.S. PATENT DOCUMENTS

2006/0256200 A1* 11/2006 Matei .................... H04N 7/183
                                                         348/208.14
2011/0234750 A1     9/2011 Lai et al.
(Continued)

FOREIGN PATENT DOCUMENTS

CN       101046623 A     10/2007
CN       101231456 A      7/2008
(Continued)

*Primary Examiner* — Paul M Berardesca
(74) *Attorney, Agent, or Firm* — Cheng-Ju Chiang

(57) ABSTRACT

The present application is applicable in the field of videos. Provided are a method and system for panoramic video stabilization, and a portable terminal. The method comprises: acquiring in real time the timestamp of a current state, an accelerometer count value, and an angular velocity value of a portable terminal; estimating the rotation vector of the current state by utilizing an Extended Kalman Filtering combined with the accelerometer count value and the angular velocity value; calculating a current rotation matrix via the Rodrigues' rotation formula on the basis of the rotation vector of the current state; and rotating a panoramic image on the basis of the current rotation matrix and producing a stabilized video frame. The present invention allows the stabilization of a jittering video frame and alleviates VR motion sickness.

9 Claims, 3 Drawing Sheets

(58) Field of Classification Search
CPC ............ G06T 3/60–608; G06T 3/4038; G03B 37/00–06
See application file for complete search history.

(56) References Cited

U.S. PATENT DOCUMENTS

2013/0329072 A1* 12/2013 Zhou ................... G06T 3/4038
  348/222.1
2014/0104445 A1* 4/2014 Ramachandran ...... G01C 25/00
  348/208.2

FOREIGN PATENT DOCUMENTS

| CN | 106507094 A | 3/2017 |
| CN | 107040694 A | 8/2017 |

* cited by examiner

METHOD AND SYSTEM FOR PANORAMIC VIDEO STABILIZATION, AND PORTABLE TERMINAL

CROSS REFERENCE TO RELATED APPLICATIONS

The present application is a 35 U.S.C. § 371 National Phase conversion of International (PCT) Patent Application No. PCT/CN2018/075265, filed on Feb. 5, 2018, which claims priority of Chinese Patent Application No. 201710225056.0, filed on Apr. 7, 2017, the disclosure of which is incorporated by reference herein. The PCT International Patent Application was filed and published in Chinese.

FIELD OF THE INVENTION

The present invention relates to the field of video, and especially a method and a system for panoramic video stabilization, and a portable terminal.

BACKGROUND OF THE INVENTION

Panoramic video of the existing technology makes the user feel sick and dizzy when he wears the VR glasses. VR motion sickness is a problem not yet well solved, not only the hardware having no breakthroughs, but the software part also being a problem. Especially for a VR panoramic video, when it is taken with a hand-held panoramic camera, the imaging shaking will accelerate VR motion sickness to happen.

SUMMARY OF THE INVENTION

Technical Problems

An object of the present invention is to provide a method and a system for panoramic video stabilization, and a portable terminal, which aims to solve the problem that imaging shaking accelerates VR motion sickness happing.

Technical Solution

At a first aspect, the present invention provides a method for panoramic video stabilization, and the method comprises steps of:

acquiring a timestamp, an accelerometer value and an angular velocity value of the current state of a portable terminal in real time;

estimating a rotation vector of the current state using an Extended Kalman Filtering combined with the accelerometer value and the angular velocity value;

calculating a current rotation matrix via the Rodrigues' rotation formula on the basis of the rotation vector of the current state; and rotating a panoramic image on the basis of the current rotation matrix, and producing a stabilized video frame.

At a second aspect, the present invention provides a system for panoramic video stabilization, and the system comprises:

an acquiring module, for acquiring a timestamp, an accelerometer value and an angular velocity value of the current state of a portable terminal in real time;

an estimating module, for estimating a rotation vector of the current state using an Extended Kalman Filtering combined with the accelerometer value and the angular velocity value;

a calculating module, for calculating a current rotation matrix via the Rodrigues' rotation formula on the basis of the rotation vector of the current state; and a video frame generation module, for rotating a panoramic image on the basis of the current rotation matrix, and producing a stabilized video frame.

At a third aspect, the present invention provides a portable terminal, comprising a memory and a processor; the processor and the memory are connected by bus; the memory is used for storing a set of program codes therein, the processor executes the program codes and performs steps of:

acquiring a timestamp, an accelerometer value and an angular velocity value of the current state of a portable terminal in real time;

estimating a rotation vector of the current state using an Extended Kalman Filtering combined with the accelerometer value and the angular velocity value;

calculating a current rotation matrix via the Rodrigues' rotation formula on the basis of the rotation vector of the current state; and rotating a panoramic image on the basis of the current rotation matrix, and producing a stabilized video frame.

Advantages

Because the angle estimated by accelerometer values is easily interfered (such as by walking, hiking and running, etc.); and the cumulative error of angular velocity will become larger and larger over time. In the present invention, estimating a rotation vector of the current state using an Extended Kalman Filtering combined with the accelerometer value and the angular velocity value, calculating a current rotation matrix via the Rodrigues' rotation formula on the basis of the rotation vector of the current state, and then rotating a panoramic image; thereby a shaking video frames can be finally stabilized, and thus VR motion sickness can be alleviated.

DETAILED DESCRIPTION

Aspects, features, and advantages of the present invention will become clearer and better understood by reference to the following detailed description of the embodiments of the invention when considered in connection with the accompanying drawings. The following description of certain embodiments of the invention are not intended to limit the invention to these embodiments, but rather, are only explains the present invention.

The features of the present are now described in connection with the following detailed embodiments.

First Embodiment

Figure 1:
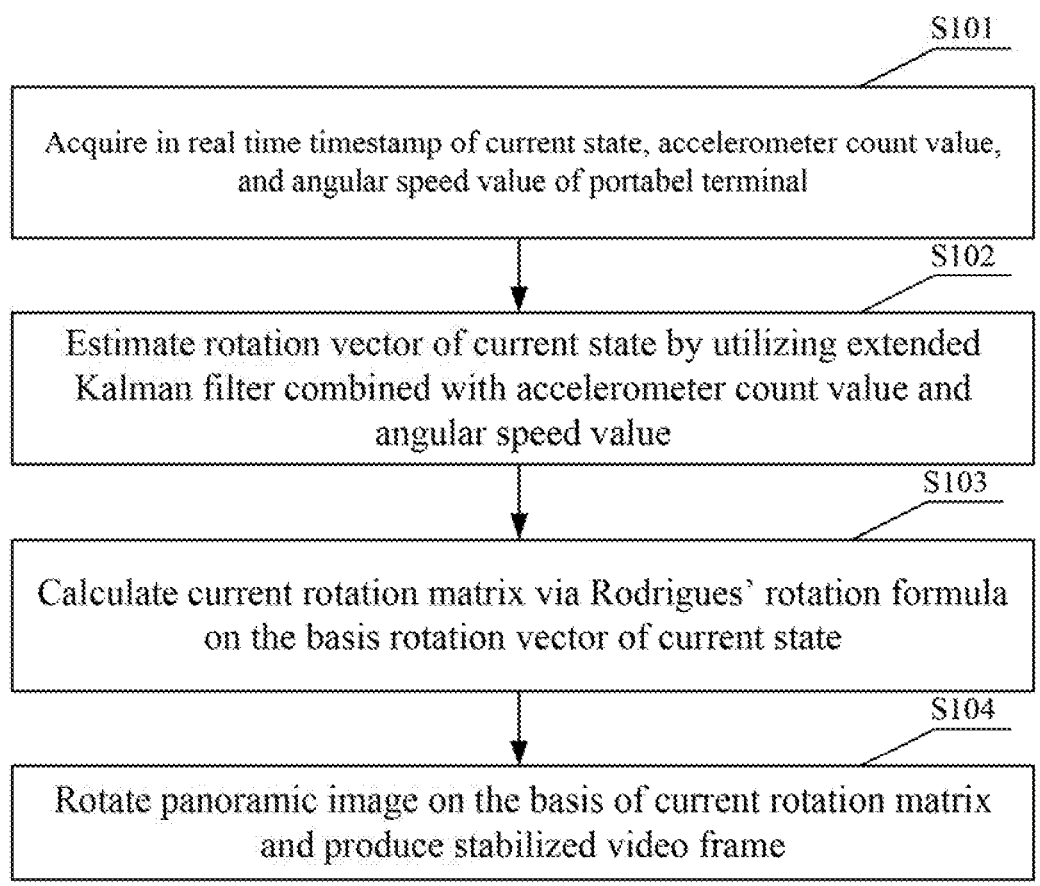
FIG. 1 is a flow chart illustrating a method for panoramic video stabilization in accordance with a first embodiment of to the present invention.

Referring to FIG. 1, a method for panoramic video stabilization in the first embodiment of the present invention comprises the following steps of:

S101, acquiring a timestamp, an accelerometer value and an angular velocity value of the current state of a portable terminal in real time.

Where, in the first embodiment of the present invention, the step of "acquiring an accelerometer value of a portable terminal in real time", specifically can be: reading a triaxial accelerometer value using a gravity sensor.

Where the step of "acquiring an angular velocity value of the portable terminal in real time", specifically can be: reading a triaxial angular velocity value using an angular speed sensor.

In the first embodiment of the present invention, after S101, the method can further comprise a step of:

performing a noise reduction process to the accelerometer value and the angular velocity value using low-pass filtering; and which specifically can comprise:

performing the noise reduction process using low-pass filtering respectively to the accelerometer value and the angular velocity value with a formula of $d_i' = \alpha \cdot d_i + (1-\alpha) \cdot d_{i-1}'$; where $d_i$ represents the accelerometer value or the angular velocity value at time i, $d_i'$ represents the accelerometer value or the angular velocity value after the noise reduction process using low-pass filtering at time i, and $d_{i-1}'$ represents the accelerometer value or the angular velocity value after the noise reduction process using low-pass filtering at time i−1; $\alpha$ is a smoothing factor, $$\alpha = \frac{\Delta t}{Rc + \Delta t}, Rc = \frac{1}{2\pi f_c},$$

where $f_c$ is a cut-off frequency of low-pass filtering, Rc is a time constant, and $\Delta t$ is a sampling time interval.

S102, estimating a rotation vector of the current state using an Extended Kalman Filtering combined with the accelerometer value and the angular velocity value.

The Extended Kalman Filtering is a kind of high efficient recursive filter, which linearizes a nonlinear system and then performs Kalman Filtering. It can be used to estimate the state of a dynamic system from a series of measurements which do not fully contain noise.

Figure 2:
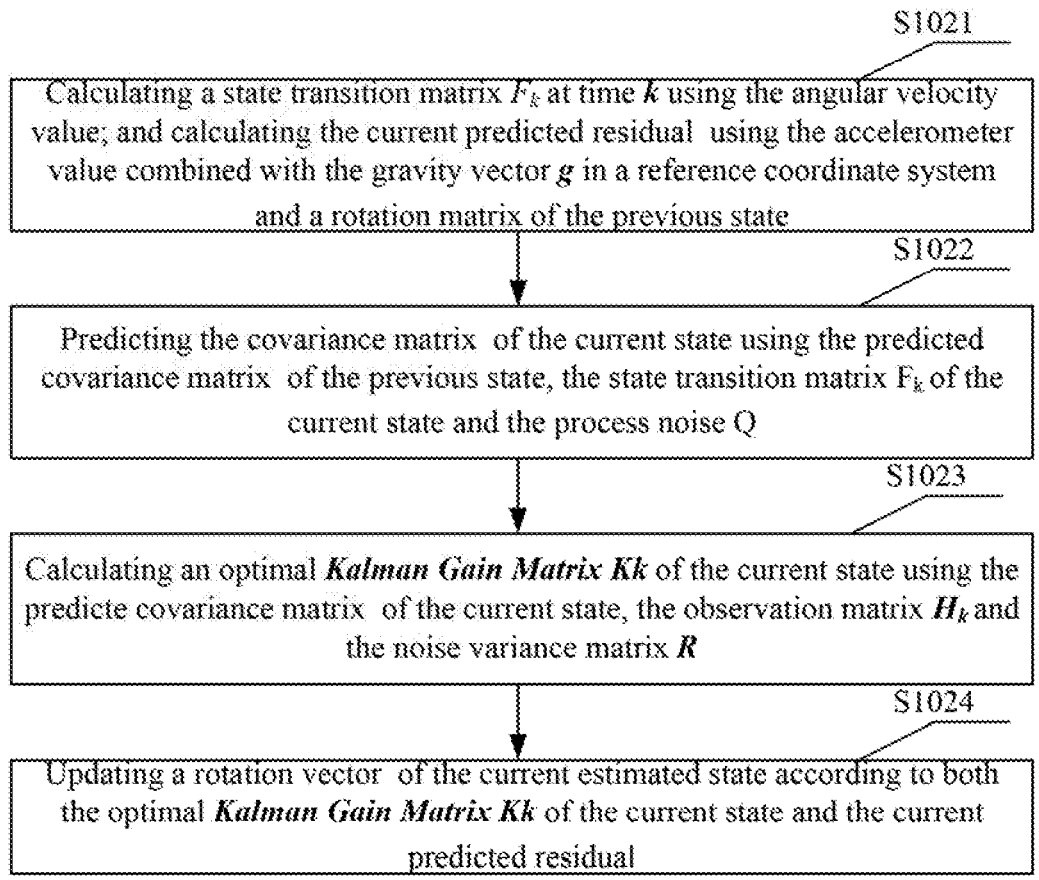
FIG. 2 is a flow chart illustrating S102 of the method for panoramic video stabilization in accordance with the first embodiment of to the present invention.

Referring to FIG. 2, in the first embodiment of the present invention, S102 specifically comprises steps of:

S1021, calculating a state transition matrix $F_k$ at time k using the angular velocity value; and calculating the current observation residual $\hat{y}_k$ using the accelerometer value combined with the gravity vector g in a reference coordinate system and a rotation matrix of the previous state;

in the first embodiment of the present invention, S1021 specifically comprises steps of:

initializing an initial state transition matrix, an initial predicted covariance matrix, and an initial observation information matrix, where the initial state transition matrix $$F_0 = \begin{bmatrix} 1 & 0 & 0 \\ 0 & 1 & 0 \\ 0 & 0 & 1 \end{bmatrix},$$

the initial predicted covariance matrix $$P_0 = \begin{bmatrix} 25.0 & 0 & 0 \\ 0 & 25.0 & 0 \\ 0 & 0 & 25.0 \end{bmatrix},$$

and the initial observation information matrix $$H_0 = \begin{bmatrix} 1 & 0 & 0 \\ 0 & 1 & 0 \\ 0 & 0 & 1 \end{bmatrix};$$

calculating a state transition matrix $$F_k = \frac{\partial f}{\partial x}\bigg|_{x_{k-1}, u_k}$$

at time k, calculating the observation information matrix $$H_k = \frac{\partial h}{\partial x}\bigg|_{x_k};$$

where $x_{k-1}$ represents a state estimate of the portable terminal at the time of k−1, $x_k$ represents a state estimate of the portable terminal at the time of k, $\partial$ represents a partial differential, $f$ represents a function of the state equation, x represents a state of the portable terminal, that is, rotation angles of three-Axis direction, h represents a function of the observation equation; $\hat{x}_{k-1|k-2} = f(x_{k-2}, u_{k-1}, w_{k-1})$, $\hat{x}_{k|k-1} = f(x_{k-1}, u_k, w_k)$ where $x_{k-2}$ represents the state of the portable terminal at the time of k−2, $u_{k-1}$ represents the angular velocity value at the time of k−1, $w_{k-1}$ represents a process noise at the time of k−1, $\hat{x}_{k-1|k-2}$ represents using the state estimate at time k−2 to predict the state estimate of the portable terminal at time k−1, $x_{k-1}$ represents a state of the portable terminal at the time of k−1, $u_k$ represents the angular velocity value at the time of k, $w_k$ represents a process noise at the time of k, $\hat{x}_{k|k-1}$ represents using the state estimate at time k−1 to predict the state estimate of the portable terminal at time k; $x_{k-2} = [X_{k-2}, Y_{k-2}, Z_{k-2}]^T$, where $X_{k-2}, Y_{k-2}, Z_{k-2}$ represent the respective rotation angles of the x Axis, y Axis, and z Axis in the reference coordinate system at the time of k−2, $x_{k-1} = [X_{k-1}, Y_{k-1}, Z_{k-1}]^T$, here $X_{k-1}, Y_{k-1}, Z_{k-1}$ represent the respective rotation angles of x Axis, y Axis, and z Axis in the reference coordinate system at the time of k−1, T denotes a transpose;

projecting the gravity acceleration vertical downwards in the reference coordinate system into the rigid-body coordinate system, and calculating the observation residual $\hat{y}_k$ with the formula $\hat{y}_k = z_k - H_k \hat{x}_{k|k-1}$, where $z_k$ represents the accelerometer value at time k after the noise reduction processing using low-pass filtering; $H_k$ is an observation information matrix and represents a Jacobian matrix calculated with the observation formula $z_k = h(x_k, g, v_k)$ using the current state estimate, where g is the gravity vector vertical downwards in the reference coordinate system, $g = [0, 0, -9.81]^T$, $v_k$ is a measurement error.

S1022, predicting the covariance matrix $P_{k|k-1}$ of the current state using the predicted covariance matrix $P_{k-1|k-1}$ of the previous state, the state transition matrix $F_k$ of the current state and the process noise Q;

in the first embodiment of the present invention, S1022 specifically is: predicting the covariance matrix $P_{k|k-1}$ of the state with the formula $P_{k|k-1} = F_k \cdot P_{k-1|k-1} \cdot F_k^T + Q_k$, where $P_{k-1|k-1}$ represents the covariance matrix at time k−1, $Q_k$ represents the process-noise covariance matrix, $$Q_k = \begin{bmatrix} dt^2 & & \\ & dt^2 & \\ & & dt^2 \end{bmatrix},$$

dt represents time interval of sampling the gyroscopes data, $F_k$ represents the state transition matrix at time k, and $F_k^T$ represents a transpose of $F_k$.

S1023, calculating an optimal Kalman Gain Matrix Kk of the current state using the predicted covariance matrix $P_{k|k-1}$ of the current state, the observation information matrix $H_k$ and the noise variance matrix R;

in the first embodiment of the present invention, S 1023 specifically can comprise:

calculating the optimal Kalman Gain Matrix Kk at time K using the predicted covariance matrix $P_{k|k-1}$ of predicting the state, $K_k = P_{k|k-1} \cdot H_k^T (H_k \cdot P_{k|k-1} \cdot H_k^T + R)^{-1}$, where R represents the noise variance matrix, $$R = \begin{bmatrix} \sigma^2 & & \\ & \sigma^2 & \\ & & \sigma^2 \end{bmatrix},$$

where $\sigma^2$ represents noise variance; and generally $\sigma=0.75$, $H_k$ is an observation information Jacobian matrix at time k, and $H_k^T$ represents a transpose of $H_k$.

S1024, updating a rotation vector $\hat{x}_{k|k}$ of the current state estimate according to both the optimal Kalman Gain Matrix Kk of the current state and the current observation residual $\hat{y}_k$.

In the first embodiment of the present invention, S1024 specifically can comprise steps of:

updating a state estimate to obtain the rotation vector $\hat{x}_{k|k}$ of the current state by combing the accelerometer value and the angular velocity value at time k, $\hat{x}_{k|k} = \hat{x}_{k|k-1} + K_k \hat{y}_k$, and then updating the predicted covariance matrix $P_{k|k}$, $P_{k|k} = (I - K_k \cdot H_k) P_{k|k-1}$, where I represents a unit matrix, and $P_{k|k}$ represents the covariance matrix $P_{k|k-1}$ to be estimated next time.

S103, calculating a current rotation matrix via the Rodrigues' rotation formula on the basis of the rotation vector of the current state.

Rodrigues' rotation formula is used to calculate the new vector after the vector rotates a given angle around a rotational axis in three-dimensional space. This formula uses the original vector, the rotational Axis and their cross product as a frame to represent the vector after rotation.

S104, rotating a panoramic image on the basis of the current rotation matrix, and producing a stabilized video frame.

in the first embodiment of the present invention, S104 can specifically comprise steps of:

mapping points on a longitude-latitude image to points on a spherical image;

generating a stabilized video frame by rotating all points on the unit sphere using the current rotation matrix;

where a step of "rotating all points on the unit sphere using the current rotation matrix" can specifically use the formula $$\begin{bmatrix} x_{new} \\ y_{new} \\ z_{new} \end{bmatrix} = M_k \begin{bmatrix} x \\ y \\ z \end{bmatrix} + t,$$

where x, y, z represent spherical coordinates before an unit circle rotation, $x_{new}, y_{new}, z_{new}$ represent spherical coordinates after rotation, $M_k$ represents the current rotation matrix, and t represents a displacement vector, $t=[0,0,0]^T$.

Second Embodiment

Figure 3:
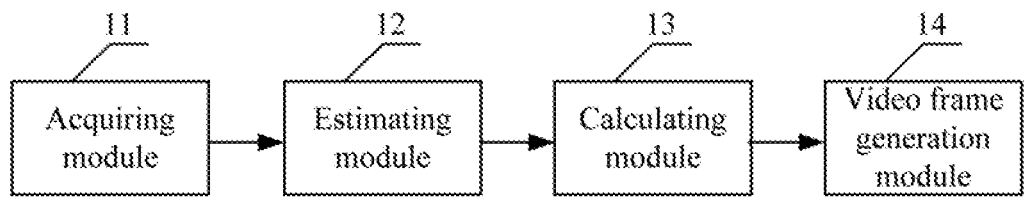
FIG. 3 is a diagram illustrating a system for panoramic video stabilization in accordance with a second embodiment of to the present invention.

Referring to FIG. 3, a system for panoramic video stabilization provided in accordance with the second embodiment of the present invention, comprises:

an acquiring module 11, for acquiring a timestamp, an accelerometer value and an angular velocity value of the current state of a portable terminal in real time;

an estimating module 12, for estimating a rotation vector of the current state using an Extended Kalman Filtering combined with the accelerometer value and the angular velocity value;

a calculating module 13, for calculating a current rotation matrix via the Rodrigues' rotation formula on the basis of the rotation vector of the current state; and a video frame generation module 14, for rotating a panoramic image on the basis of the current rotation matrix, and producing a stabilized video frame.

In the second embodiment of the present invention, the system further comprises:

a noise reduction module, for performing a noise reduction process to the accelerometer value and the angular velocity value using low-pass filtering.

The estimating module can specifically comprise:

a predicted-residual calculation module, for calculating a state transition matrix $F_k$ at time k using the angular velocity value, and calculating the current observation residual $\hat{y}_k$ using the accelerometer value combined with the gravity vector g in a reference coordinate system and a rotation matrix of the previous state;

a covariance-matrix predicating module, for predicting the covariance matrix $P_{k|k-1}$ of the current state using the predicted covariance matrix $P_{k-1|k-1}$ of the previous state, the state transition matrix $F_k$ of the current state and the process noise Q;

an optimal Kalman Gain Matrix Kk calculating module, for calculating the optimal Kalman Gain Matrix Kk of the current state using the predicted covariance matrix $P_{k|k-1}$ of the current state, the observation information matrix $H_k$ and the noise variance matrix R; and an updating module, for updating the rotation vector $\hat{x}_{k|k}$ of the current state estimate according to both optimal Kalman Gain Matrix Kk of the current state and the current observation residual $\hat{y}_k$.

The video frame generation module can specifically comprise:

a mapping module, for mapping points on a longitude-latitude image to points on a spherical image; and a rotating module, for generating a stabilized video frame by rotating all points on the unit sphere using the current rotation matrix.

Third Embodiment

Figure 4:
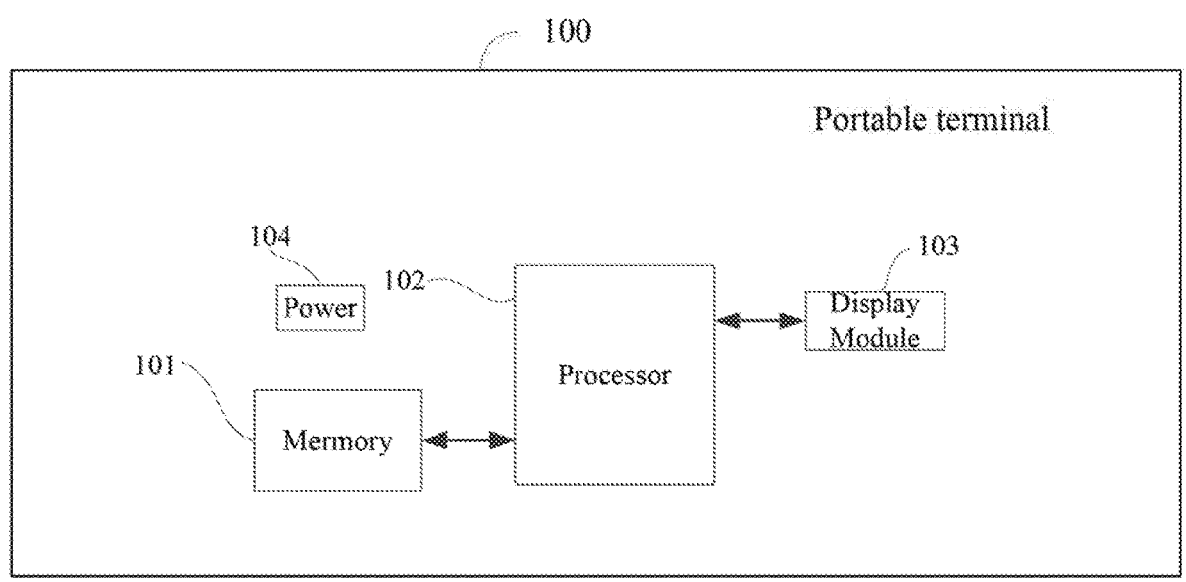
FIG. 4 is a block diagram illustrating a structure of a portable terminal in accordance with a third embodiment of to the present invention.

FIG. 4 illustrates a specific structural block diagram of a portable terminal provided in the third embodiment of the present invention, and the portable terminal 100 can be used to perform the method and system for panoramic video stabilization provided in the above embodiments.

Referring to FIG. 4, the portable terminal 100 provided in the third embodiment of the present invention can comprises such parts as one or more (only one is shown in FIGS) memory 101 of computer readable storage medium, one or more (only one is shown in FIGS) processor 102 of processing core, display module 103 and a power 104. Those skilled in the art understand that the portable terminals shown in FIG. 4 does not intent to limit the portable terminals, and the portable terminal may include more or fewer parts than illustrated, or may combine certain components, or may have different assembly arrangements. Where the processor 102 and memory 101 are connected by bus; the memory 101 can be used to store software programs and modules, and the corresponding program instructions/modules of the method and system for panoramic video stabilization described in the above-mentioned embodiments. The processor 102 is used to run program codes stored in the memory 101 to perform the following steps:

acquiring a timestamp, an accelerometer value and an angular velocity value of the current state of a portable terminal in real time;

estimating a rotation vector of the current state using an Extended Kalman Filtering combined with the accelerometer value and the angular velocity value;

calculating a current rotation matrix via the Rodrigues' rotation formula on the basis of the rotation vector of the current state; and rotating a panoramic image on the basis of the current rotation matrix, and producing a stabilized video frame.

Because the angle estimated by accelerometer values is easily interfered (such as by walking, hiking and running); and the cumulative error of angular velocity will become larger and larger over time. In the present invention, estimating a rotation vector of the current state using an Extended Kalman Filtering combined with the accelerometer value and the angular velocity value, calculating a current rotation matrix via the Rodrigues' rotation formula on the basis of the rotation vector of the current state, and then rotating a panoramic image; thereby a shaking video frames can be finally stabilized, and thus VR motion sickness can be alleviated.

Those skilled in the art can understand that all or part of the steps of the method described in the above-mentioned embodiments can be performed by program to instruct the related hardware, the program can be stored in a computer readable storage medium, and the storage medium includes such as a ROM/RAM, disk, an optical disc, and the like.

The above mentioned is preferable embodiments of the invention and is not intended to limit the scope of the inventions. Any modification, substitution and improvements, etc., may be made without departing from the spirit of the inventions, shall be included in the protection scope of the invention.

What is claimed is:

1. A method for panoramic video stabilization, comprising steps of:

acquiring a timestamp, an accelerometer value and an angular velocity value of the current state of a portable terminal in real time;

estimating a rotation vector of the current state using an Extended Kalman Filtering combined with the accelerometer value and the angular velocity value;

calculating a current rotation matrix via the Rodrigues' rotation formula on the basis of the rotation vector of the current state; and rotating a panoramic image on the basis of the current rotation matrix, and producing a stabilized video frame.

2. The method of claim 1, wherein:

a step of "acquiring an accelerometer value of a portable terminal in real time" specifically is: reading a triaxial accelerometer value using a gravity sensor;

a step of "acquiring an angular velocity value of a portable terminal in real time", specifically is: reading a triaxial angular velocity value using an angular speed sensor.

3. The method of claim 1, wherein after the step of "acquiring a timestamp, an accelerometer value and an angular velocity value of the current state of a portable terminal in real time", the method further comprises a step of:

performing a noise reduction process to the accelerometer value and the angular velocity value using low-pass filtering.

4. The method of claim 3, wherein the step of "performing a noise reduction process to the accelerometer value and the angular velocity value using low-pass filtering", specifically comprises:

performing the noise reduction process using low-pass filtering respectively to the accelerometer value and the angular velocity value with a formula of $d_i'=\alpha \cdot d_i+(1-\alpha) \cdot d_{i-1}'$; where $d_i$ represents the accelerometer value or the angular velocity value at time i, $d_i'$ represents the accelerometer value or the angular velocity value after the noise reduction process using low-pass filtering at time i, and $d_{i-1}'$ represents the accelerometer value or the angular velocity value after the noise reduction process using low-pass filtering at time i−1; α is a smoothing factor, $$\alpha = \frac{\Delta t}{Rc + \Delta t}, Rc = \frac{1}{2\pi f_c},$$

where $f_c$ is a cut-off frequency of low-pass filtering, Rc is a time constant, and Δt is a sampling time interval.

5. The method of claim 1, wherein the step of "estimating a rotation vector of the current state using an Extended Kalman Filtering combined with the accelerometer value and the angular velocity value", specifically comprises steps of:

calculating a state transition matrix $F_k$ at time k using the angular velocity value; and calculating a current observation residual $\hat{y}_k$ using the accelerometer value combined with gravity vector g in a reference coordinate system and a rotation matrix of the previous state;

predicting a covariance matrix $P_{k|k-1}$ of the current state using a predicted covariance matrix $P_{k-1|k-1}$ of the previous state, the state transition matrix $F_k$ of the current state and a process noise Q;

calculating an optimal Kalman Gain Matrix Kk of the current state using the predicted covariance matrix $P_{k|k-1}$ of the current state, an observation information matrix $H_k$ and a noise variance matrix R; and updating a rotation vector $\hat{x}_{k|k}$ of the current state estimate according to both optimal Kalman Gain Matrix Kk of the current state and the current observation residual $\hat{y}_k$.

6. The method of claim 5, wherein:

the step of "calculating a state transition matrix $F_k$ at time k using the angular velocity value; and calculating a current observation residual $\hat{y}_k$ using the accelerometer value combined with gravity vector g in a reference coordinate system and a rotation matrix of the previous state" specifically comprises steps of:

initializing an initial state transition matrix, an initial predicted covariance matrix, and an initial observation information matrix, where the initial state transition matrix $$F_0 = \begin{bmatrix} 1 & 0 & 0 \\ 0 & 1 & 0 \\ 0 & 0 & 1 \end{bmatrix},$$

the initial predicted covariance matrix $$P_0 = \begin{bmatrix} 25.0 & 0 & 0 \\ 0 & 25.0 & 0 \\ 0 & 0 & 25.0 \end{bmatrix},$$

and the initial observation information matrix $$H_0 = \begin{bmatrix} 1 & 0 & 0 \\ 0 & 1 & 0 \\ 0 & 0 & 1 \end{bmatrix};$$

calculating a state transition matrix $$F_k = \frac{\partial f}{\partial x}\bigg|_{x_{k-1}, u_k}$$

at time k, calculating an observation information matrix $$H_k = \frac{\partial h}{\partial x}\bigg|_{x_k};$$

where $x_{k-1}$ represents a state estimate of the portable terminal at the time of k−1, $x_k$ represents a state estimate of the portable terminal at the time of k, $\partial$ represents a partial differential, $f$ represents a function of the state equation, x represents a state of the portable terminal, that is, rotation angles of three-Axis direction, h represents a function of the observation equation, $\hat{x}_{k-1|k-2} = f(x_{k-2}, u_{k-1}, w_{k-1})$, $\hat{x}_{k|k-1} = f(x_{k-1}, u_k, w_k)$, where $x_{k-2}$ represents a state estimate of the portable terminal at the time of k−2, $u_{k-1}$ represents an angular velocity value at the time of k−1, $w_{k-1}$ represents a process noise at the time of k−1, $\hat{x}_{k-1|k-2}$ represents using the state estimate at time k−2 to predict the state estimate of the portable terminal at time k−1, $x_{k-1}$ represents a state of the portable terminal at the time of k−1, $u_k$ represents an angular velocity value at the time of k, $w_k$ represents a process noise at the time of k, $\hat{x}_{k|k-1}$ using the state estimate at time k−1 to predict the state estimate of the portable terminal at time k, $x_{k-2} = [X_{k-2}, Y_{k-2}, Z_{k-2}]^T$, where $X_{k-2}, Y_{k-2}, Z_{k-2}$ represent respective rotation angles of x Axis, y Axis, and z Axis in the reference coordinate system at the time of k−2; $x_{k-1} = [X_{k-1}, Y_{k-1}, Z_{k-1}]^T$, where $X_{k-1}, Y_{k-1}, Z_{k-1}$ represent respective rotation angles of x Axis, y Axis, and z Axis in the reference coordinate system at the time of k−1, T denotes a transpose; and projecting the gravity acceleration vertical downwards in the reference coordinate system into a rigid-body coordinate system, and calculating the observation residual $\hat{y}_k$ with the formula $\hat{y}_k = z_k - H_k \hat{x}_{k|k-1}$, where $z_k$ represents an accelerometer value at time k after the noise reduction processing using low-pass filtering; $H_k$ represents the observation information matrix and represents a Jacobian matrix calculated with the observation formula $z_k = h(x_k, g, v_k)$ using the current state estimate, where g is the gravity vector vertical downwards in the reference coordinate system, $g = [0, 0, -9.81]^T$, $v_k$ is a measurement error;

the step of "predicting a covariance matrix $P_{k|k-1}$ of the current state using a predicted covariance matrix $P_{k-1|k-1}$ of the previous state, the state transition matrix $F_k$ of the current state and a process noise Q" specifically comprises:

predicting the predicted covariance matrix $P_{k|k-1}$ of the state with the formula $P_{k|k-1} = F_k \cdot P_{k-1|k-1} \cdot F_k^T + Q_k$, where $P_{k-1|k-1}$ represents the predicted covariance matrix at time k−1, $Q_k$ represents an process-noise covariance matrix, $$Q_k = \begin{bmatrix} dt^2 & & \\ & dt^2 & \\ & & dt^2 \end{bmatrix},$$

dt represents time interval of sampling gyroscopes data, $F_k$ represents the state transition matrix at time k, and $F_k^T$ represents a transpose of $F_k$;

the step of "calculating an optimal Kalman Gain Matrix Kk of the current state using the predicted covariance matrix $P_{k|k-1}$ of the current state, an observation information matrix $H_k$ and a noise variance matrix R" specifically comprises:

calculating the optimal Kalman Gain Matrix Kk at time K using the predicted covariance matrix $P_{k|k-1}$ of predicting the state, $K_k = P_{k|k-1} \cdot H_k^T (H_k \cdot P_{k|k-1} \cdot H_k^T + R)^{-1}$, where R represents the noise variance matrix, $$R = \begin{bmatrix} \sigma^2 & & \\ & \sigma^2 & \\ & & \sigma^2 \end{bmatrix},$$

where $\sigma^2$ represents noise variance; and generally $\sigma = 0.75$, $H_k$ is an observation information Jacobian matrix at time k, and $H_k^T$ represents a transpose of $H_k$;

the step of "updating a rotation vector $\hat{x}_{k|k}$ of the current state estimate according to both optimal Kalman Gain Matrix Kk of the current state and the current observation residual $\hat{y}_k$" comprises:

updating a state estimate to obtain the rotation vector $\hat{x}_{k|k}$ of the current state by combing the accelerometer value and the angular velocity value at time k, $\hat{x}_{k|k} = \hat{x}_{k|k-1} + K_k \hat{y}_k$, and then updating the predicted covariance matrix $P_{k|k}$, $P_{k|k} = (I - K_k H_k) P_{k|k-1}$, where I represents a unit matrix, and $P_{k|k}$ represents the error covariance matrix $P_{k|k-1}$ to be estimated next time.

7. The method of claim 1, wherein the step of "rotating a panoramic image on the basis of the current rotation matrix, and producing a stabilized video frame" specifically comprises:

mapping points on a longitude-latitude image to points on a spherical image; and generating a stabilized video frame by rotating all points on the unit sphere using the current rotation matrix.

8. The method of claim 7, wherein the step of "rotating all points on a unit sphere using the current rotation matrix" specifically uses the formula $$\begin{bmatrix} x_{new} \\ y_{new} \\ z_{new} \end{bmatrix} = M_k \begin{bmatrix} x \\ y \\ z \end{bmatrix} + t,$$

where x, y, z represent spherical coordinates before an unit circle rotation, $x_{new}, y_{new}, z_{new}$ represent spherical coordinates after rotation, $M_k$ represents the current rotation matrix, and t represents a displacement vector, $t=[0,0,0]^T$.

9. A portable terminal, comprising a memory and a processor, wherein the memory and the processor are connected by bus; the memory is used to store a set of program codes, and the processor is used to run the program codes stored in the memory to perform the steps of:

acquiring a timestamp, an accelerometer value and an angular velocity value of the current state of a portable terminal in real time;

estimating a rotation vector of the current state using an Extended Kalman Filtering combined with the accelerometer value and the angular velocity value;

calculating a current rotation matrix via the Rodrigues' rotation formula on the basis of the rotation vector of the current state; and rotating a panoramic image on the basis of the current rotation matrix, and producing a stabilized video frame.

\* \* \* \* \*